3,075,993
α-HYDRAZINO-β-(5-HYDROXY-3-INDOLYL) ALKANOIC ACIDS
John M. Chemerda, Metuchen, Meyer Sletzinger, North Plainfield, and Frederick W. Bollinger, Westfield, N.J., assignors to Merck & Co., Inc., Rahway, N.J., a corporation of New Jersey
No Drawing. Filed May 18, 1961, Ser. No. 110,894
9 Claims. (Cl. 260—319)

This invention relates to new hydrazino acids. More specifically, this invention relates to compounds of the structure—

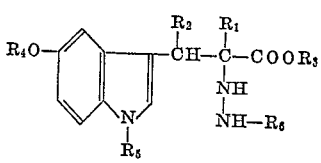

in which $R_1$, $R_2$ and $R_3$ may be hydrogen or lower alkyl, $R_4$ and $R_6$ may be hydrogen or lower alkanoyl and $R_5$ may be hydrogen or lower alkanoyl, lower alkyl, aralkyl, and nontoxic salts of these compounds.

It has been found that α-methyl-β-3,4-dihydroxyphenylalanine inhibits mammalian decarboxylase and inhibits the accumulation of norepinephrine in both the heart and the brain. This substituted alanine, further, has been found to be a strong agent for combatting hypertension.

It has now been found that α-hydrazino-β-(5-hydroxy-3-indolyl) alkanoic acids and their esters and alkanoyl derivatives are a new class of compounds which are also potent inhibitors of mammalian decarboxylase. These new compounds are, moreover, useful as intermediates in the preparation of other compounds and as reagents for the separation of ketonic from non-ketonic materials.

As intermediates, the new compounds of this invention can be used to prepare a class of compounds resembling serotonin in structure, but differing in being hydrazines instead of amines. This is accomplished by decarboxylating the compounds of our invention enzymatically, using, e.g., mammalian decarboxylase obtainable by the evaporation of the aqueous extract of ground beef or hog kidney or liver. The hydrazino acid is heated at 37° C. with the enzyme and the co-enzyme pyridoxal phosphate in an aqueous medium, buffered at a pH of 6.8, to give the corresponding hydrazine.

In further use as intermediates, both the decarboxylated hydrazines so produced and the hydrazino acids of this invention can be condensed with acylacetic esters, in the procedure usually used with phenyl hydrazines, followed by alkylation of the pyrazalone product, to yield compounds resembling in structure the antipyrine type of analgesic and antineuralgic. The hydrazino acids of this invention thus can be used to prepare this pyrazolone type of compound having a carboxyl function as an additional substituent.

The compounds of this invention are further useful in the separation of ketonic products from non-ketonic products, in a manner similar to that in which Girard's reagent is used (Girard et al., Helv. Chim. Acta, 19, 1095 (1936); see also Fieser, Steroids, Reinhold, N.Y., 1959, pages 449 and 606). Being hydrazines, they can be reacted with a carbonyl compound to form a hydrazone. Since they are also carboxylic acids, the resulting hydrazones can be dissolved in aqueous alkali and the carbonyl compounds regenerated with acid. Thus, they are in contrast with Girard's P and T reagents which are quaternary ammonium substituted hydrazines.

The compounds of this invention are prepared from α-(5-benzyloxy-indolyl) ketones or aldehydes by the procedure shown in Flow Sheet II. The starting materials can be prepared by the procedure shown in Flow Sheet I, from 5-benzyloxy indole or its N-alkyl derivatives. In this preparation of the intermediate ketones and aldehydes, the procedure of Noland and Lange (J. Am. Chem. Soc., 81, 1203 (1959), is used to introduce a β-nitro-alkyl group into the 3-position of the benzyloxyindole. The Nef degradation (Nef, Ann., 280, 263 (1894); Hass and Riley, Chem. Rev., 32, 398 (1943), is then used to replace the nitro by a carbonyl. The synthesis of the hydrazino acids of this invention from the intermediate ketones or aldehyde is accomplished by reaction of hydrazine and a water-soluble cyanide salt (e.g., KCN, NaCN) with the ketone or aldehyde to form a hydrazino nitrile which is then hydrolyzed by mineral acid to the α-hydrazino acid. The benzyl group is removed by the HBr during the final hydrolysis of the amide to the acid to form the β-(5-hydroxyindolyl)-α-hydrazino acid of this invention.

I. SYNTHESIS OF STARTING MATERIALS

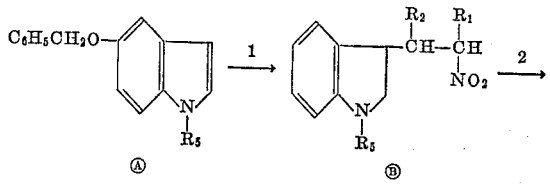

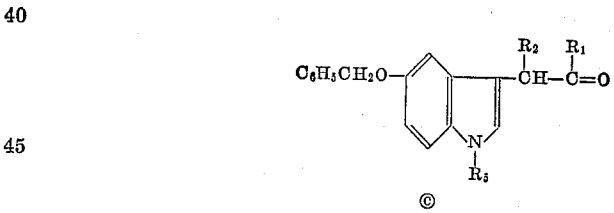

Equivalents:
  $R_1$=H, lower alkyl.
  $R_2$=H, lower alkyl.
  $R_5$=H, lower alkyl.
Reagents:
  ① Addition of a benene solution of

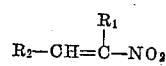

to an agitated benzene solution of the indole at room temperature, followed by evaporation of the solvent. Other inert solvents such as toluene, xylene, etc. equally.
  ②Addition, dropwise, of a solution of the 3-(2-nitroalkyl) indole (B) in aqueous sodium hydroxide to an agitated cold dilute sulfuric acid solution, followed by neutralization of the mixture, extraction with chloroform or ether, and evaporation of the dried extract.

II. SYNTHESIS OF THE HYDRAZINO ACIDS

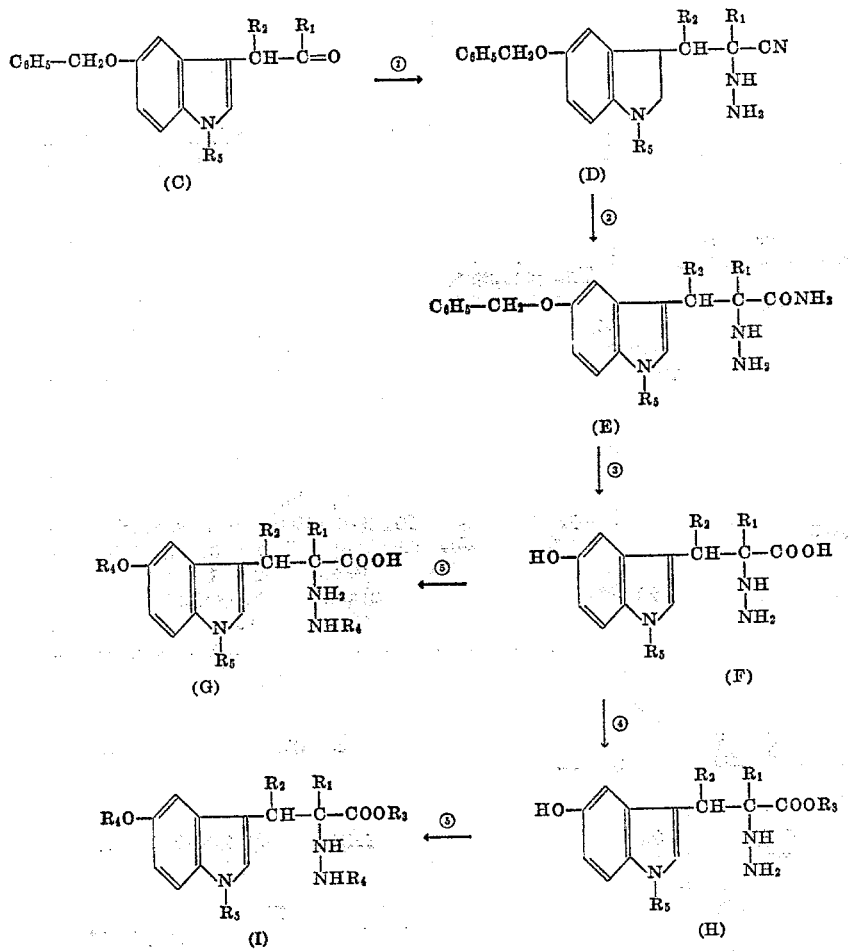

Equivalents:
R₁=H, lower alkyl
R₂=H, lower alkyl.
R₃=lower alkyl (in claims it can also be H as in (F)).
R₄=lower alkyl (in claims it can also be H as in (F)).
R₅=H, lower alkyl, lower alkanoyl (it will be lower alkanoyl in (G) and (H) when it has been H in (F), otherwise it is lower alkyl).

Reagents:
① Hydrazine and a water-soluble cyanide salt (e.g., KCN) in water solution at room temperature.
② Fortified HCl at 10 to 0°.
③ 48% HBr at reflux.
④ R₃OH plus HCl.
⑤ (R₄)₂O in pyridine solution.

In the preparation of the starting materials, as shown in Flow Sheet I, 5-benzyloxyindole or its 1-methyl, ethyl, propyl, isopropyl, butyl, etc. derivative is reacted with a nitroalkene—

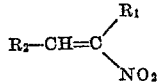

in which R₁ and R₂ are hydrogen or alkyl. This reaction produces a 3-nitroalkyl-5-benzyloxyindole in which the nitro group is on the second carbon from the indole ring. When this is subjected to the Nef degradation, in which the aci-nitro compound is formed by reaction with alkali and this is then treated with a strong mineral acid, the nitro group and a hydrogen on the same carbon in the nitroalkyl side chain are both eliminated and replaced with a carbonyl oxygen. When R₁ is hydrogen, an aldehyde is formed. When R₁ is alkyl, the intermediate so formed is a ketone. The nitroalkanes used in this preparation include nitroethylene, 1-nitro-1-propylene, 1-nitro-1-butylene, 1-nitro-1-pentene, 1-nitro-1-hexene, 2-nitro-1-propylene, 2-nitro-1-butylene, 2-nitro-1-pentene, 2-nitro-1-hexene, 2-nitro-2-butylene, 2-nitro-2-pentene, 2-nitro-2-hexene, 3-nitro-2-pentene, 3-nitro-3-hexene, 3-nitro-2-hexene, and the like.

The intermediate aldehyde or ketone is then reacted with hydrazine and a water-soluble cyanide salt to form an α-hydrazinonitrile which is hydrolyzed by mineral acid to an α-hydrazino acid through the amide. Removal of the benzyl group by hydrogenation yields the 5-hydroxyindolyl-α-hydrazino acids.

The products of our invention thus include the following:

α-Hydrazino-β-(5-hydroxy-3-indolyl)-propionic acid;
α-Hydrazino-β-(5-hydroxy-3-indolyl)-butyric acid;
α-Hydrazino-β-(5-hydroxy-3-indolyl)-caproic acid;
α-Hydrazino-α-methyl-β-(5-hydroxy-3-indolyl)-propionic acid;
α-Hydrazino-α-ethyl-β-(5-hydroxy-3-indolyl)-propionic acid;
α-Hydrazino-α-propyl-β-(5-hydroxy-3-indolyl)-propionic acid;
α-Hydrazino-α-butyl-β-(5-hydroxy-3-indolyl)-propionic acid;
α-Hydrazino-α-methyl-β-(5-hydroxy-3-indolyl)-butyric acid;
α-Hydrazino-α-methyl-β-(5-hydroxy-3-indolyl)-valeric acid;
α-Hydrazino-α-methyl-β-(5-hydroxy-3-indolyl)-caproic acid;
α-Hydrazino-α-methyl-β-(5-hydrozy-3-indolyl)-heptoic acid;
α-Hydrazino-α-ethyl-β-(5-hydroxy-3-indolyl)-butyric acid;
α-Hydrazino-α-ethyl-β-(5-hydroxy-3-indolyl)-valeric acid;

α-Hydrazino-α-ethyl-β-(5-hydroxy-3-indolyl)-caproic acid;
α-Hydrazino-β-(5-acetoxy-1-acetyl-3-indolyl)-propionic acid;
α-Hydrazino-α-methyl-β-(5-acetoxy-1-acetyl-3-indolyl)-propionic acid;
α-Hydrazino-β-(5-hydroxy-1-methyl-3-indolyl)-propionic acid;
α-Hydrazino-α-methyl-β-(5-hydroxy-1-methyl-3-indolyl)-propionic acid;
α-Hydrazino-β-(5-hydroxy-1-benzyl-3-indolyl)-propionic acid;
α-Hydrazino-α-methyl-β-(5-hydroxy-1-benzyl-3-indolyl)-propionic acid;

as well as the methyl, ethyl, propyl, butyl, and the like, carbalkoxy esters of the above compounds and of the related compounds (which also fall within the scope of our invention) in which the indolyl hydroxyl and hydrazino and indolyl nitrogens are acylated with formyl, acetyl, propionyl, etc. groups or of the related compounds in which the indolyl nitrogen carries a lower alkyl or aralkyl (such as benzyl and substituted benzyl) group (as illustrated by the last four compounds in the above list).

The carboxalkoxy esters of the above compounds can be readily prepared by esterification of the hydrazino acid with a lower alkanol in the presence of a strong acid such as sulfuric acid, hydrochloric acid, hydrobromic acid or the like.

The O, N, N acyl esters (i.e., the 5-acyloxy-1-acyl-3-indolyl compounds) are readily obtained by heating the amino acid with the proper alkanoic anhydride in the presence of a proton acceptor such as pyridine, picoline, or dimethyl aniline. Lower alkanoic anhydrides which can be used include acetic anhydride, propionic anhydride, butyric anhydride and the like. Formylation is carried out with formic acetic anhydride, prepared as described by Huffman (J. Org. Chem. 23, 728 (1958).

The esters of both types are especially useful in that one obtains much better absorption of the compound in the body and much more prolonged activity with smaller and less frequent dosage. The carbalkoxy esters, especially, can be used in the form of non-toxic salts such as the hydrobromide, hydrochloride, sulfate and the like. These salts are water-soluble and are formed in the preparation of the ester. If the free hydrazino ester is desired, it is obtained by basification of the salt. It, too, can be used therapeutically.

The compounds of this invention may be associated with a carrier which may be either a solid material or a sterile parenteral liquid. The composition may take the form of tablets, powder, capsules or other dosage forms which are particularly useful for oral ingestion. Liquid diluents are employed in sterile condition for parenteral use. In general, the free acids among the compounds of my invention are given in dosages of 10 to 350 mg./kg. per day. Preferably, they are used orally, in the range of 50 to 150 mg./kg. per day, preferably in frequent small doses, although they may also be given as infrequently as twice a day.

Our invention can be illustrated by the following examples:

*Example 1*

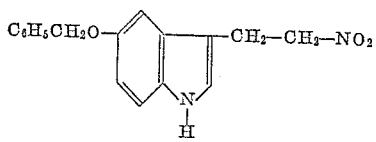

A solution of nitroethylene (0.5 mole, 36.5 g.) in 150 cc. of benzene is added, with vigorous stirring slowly to a solution of 0.5 mole (111.5 g.) of 5-benzyloxyindole in 150 cc. of benzene at room temperature. The mixture is stirred for several hours until the odor of the nitroethylene is no longer detectable. The mixture is then boiled with charcoal to decolorize it and filtered hot. The filtrate is evaporated, leaving the 3-(2-nitroethyl)-5-benzyloxy indole as the residue, which can be recrystallized from solvents such as alcohols.

When 5-benzyloxy-1-methyl, 1-ethyl, 1-propyl, 1-isopropyl, 1-butyl, or 1-benzyl indole is used in equivalent quantities in place of 5-benzyloxyindole in the above procedure, the corresponding 1-alkyl or aralkyl 3-(2-nitroethyl)-5-benzyloxyindole is obtained.

When 1-nitro-1-propylene, 1-nitro-1-butylene, 1-nitro-1-pentene or 1-nitro-1-hexene is used in equivalent quantity in place of nitroethylene, there is similarly obtained 5-benzyloxy-3-(2-nitropropyl, 2-nitrobutyl, 2-nitropentyl or 2-nitrohexyl)-indole. When the 1-substituted indoles of the preceding paragraph are used as well as these nitroalkanes, the corresponding 1-alkyl or aralkyl compounds are obtained.

*Example 2*

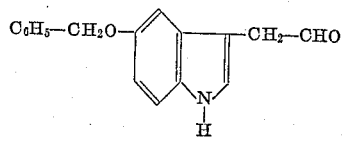

A mixture of 49.3 g. of 3-(2-nitroethyl)-5-benzyloxyindole and 300 cc. of aqueous sodium hydroxide solution containing 16 g. of NaOH is added dropwise to an ice cold mixture of 50 ml. of concentrate $H_2SO_4$ and 320 ml. of water, with vigorous stirring. The mixture is then made alkaline with additional sodium hydroxide and extracted several times with chloroform. The chloroform extracts are dried and evaporated under reduced pressure to give a residue comprising 5 - benzyloxy - 3-indolylacetaldehyde. The crude product can be freed of any residual nitro compound by several methods. One is further extraction with dilute aqueous caustic. Another is by the use of Girard's P or T reagent to dissolve the aldehyde as a water soluble hydrazone and regeneration of the aldehyde by acidification. A third is to heat the product with an excess of one of the hydrazino acids of this invention in the form of a sodium salt, followed by filtration and acidification to regenerate the aldehyde from the hydrazone.

When equivalent quantities of the other compounds prepared in Example 1 are used in place of the nitroethylbenzyloxyindole in the above procedure, there are obtained 5-benzyloxy-1-methyl, ethyl, propyl, isopropyl, butyl or benzyl-3-indolyl acetaldehyde, 2-(5-benzyloxy-3-indolyl) - propionaldehyde, 2 - (5 - benzyloxy - 3 - indolyl) - butyraldehyde, 2 - (5 - benzyloxy - 3 - indolyl)-caproaldehyde and 2-(5-benzyloxy-3-indolyl)-valeraldehyde as well as the 1-alkyl indolyl analogs of the latter compounds.

*Example 3*

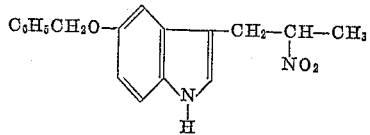

When the procedure of Example 1 is followed using an equivalent quantity of 2-nitro-1-propylene in place of nitroethylene, there is obtained 5-benzyloxy-3-(2-nitropropyl)indoles. Similarly, when, instead, an equivalent amount of 2-nitro-1-butylene, 2-nitro-1-pentene, 2-nitro-1-hexene, 2-nitro-2-butylene, 2-nitro-2-pentene, 2-nitro-2-hexene, 3-nitro-2-pentene, 3-nitro-2-hexene or 3-nitro-3-hexene is used, there is obtained 5-benzyloxy-3-(2-nitrobutyl, 2-nitropentyl, 2-nitrohexyl, 3-nitro-2-butyl, 2-nitro-3-pentyl, 2-nitro-3-hexyl, 3-nitro-2-pentyl, 3-nitro-2-hexyl or 4-nitro-3-hexyl) indole. Also, when the corresponding 5-benzyloxy-1-methyl, ethyl, propyl, isopropyl, butyl or benzyl indole is substituted for the 5-benzyloxyindole in addition to the substitution of the above nitroalkanes for the nitroethylene, the corresponding 5-benzyloxy-3-nitroalkyl-1-alkylindole is obtained.

Example 4

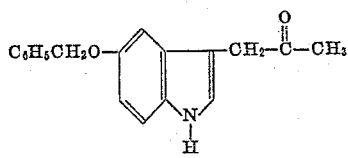

When the procedure of Example 2 is followed, using an equivalent quantity of 5-benzyloxy-3-(2-nitropropyl)-indole in place of the 5-benzyloxy-3-(2-nitroethyl)indole, there is obtained 1 - (5 - benzyloxy - 3 - indolyl)acetone. Similarly, when the other products of Example 3 are used, there are obtained 1-(5-benzyloxy-3-indolyl)-2 - butanone, 1 - (5 - benzyloxy - 3 - indolyl) - 1 - pentanone, 1 - (5 - benzyloxy - 3 - indolyl) - 1 - hexanone, 3 - (5 - benzyloxy - 3 - indolyl) - 2 - butanone, 3 - (5-benzyloxy - 3 - indolyl) - 2 - pentanone, 3 - (5 - benzyloxy - 3 - indolyl) - 2 - hexanone, 2 - (5 - benzyloxy - 3 - indolyl) - 3 - pentanone, 2 - (5 - benzyloxy - 3 - indolyl) - 3 - hexanone and 3 - (5 - benzyloxy - 3 - indolyl)-4-hexanone, as well as the corresponding 5-benzyloxy-1-methyl, ethyl, propyl, isopropyl and butyl-3-indolyl compounds.

Example 5

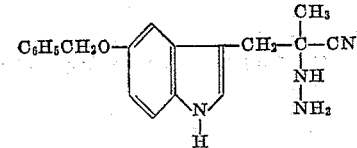

A mixture of 923 g. of 1-(5-benzyloxy-3-indolyl)-acetone, 1.85 liters of benzene and 1 kg. of potassium bisulfite in 2.00 liters of water is stirred at room temperature for several hours. The precipitated bisulfite addition product of the ketone is isolated by filtration and washed with isopropanol and then with ether. Six hundred and sixty-five grams of the adduct is mixed with 119.5 g. of potassium cyanide, 292 ml. of 85% hydrazine hydrate and 910 ml. of water. The mixture is stirred overnight at room temperature after which the product is isolated by filtration. The product is washed three times with 250 ml. portions of water and then three times with 230 ml. portions of ether. It is then air dried and vacuum dried at room temperature. By this procedure, there is obtained 5-benzyloxy-3-(2-hydrazino-2-cyanopropyl)indole.

Example 6

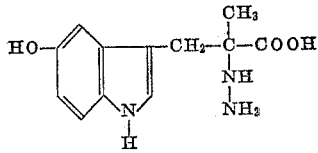

Concentrated hydrochloric acid (50 cc.) is saturated with hydrogen chloride gas at −10° C. To the solution is then added 3.6 g. of the product of Example 5, slowly with vigorous stirring. The mixture is allowed to stir overnight while warming to room temperature gradually. It is then concentrated in vacuo to a syrup. To the residual syrup is added 100 ml. of 48% hydrobromic acid. The reaction vessel is purged with nitrogen and the reaction mixture is then refluxed for three hours after which it is concentrated in vacuo to a mixture of a syrup and a solid. The residue is taken up in sufficient water to form a clear solution. Activated charcoal is added and the mixture is heated to boiling and filtered. The filtrate is concentrated to dryness in vacuo and the residue is taken up in 25 cc. of ethanol. The residual ammonium bromide is removed by filtration and to the filtrate there is added sufficient diethylamine to change the pH to 6.4. The mixture is warmed to 60° C. and then cooled to room temperature. It is then allowed to stand overnight to effect complete crystallization. It is then cooled to 0° and the product is isolated by filtration, washed with methanol and air dried. The product (α-hydrazino-α-methyl-β-(5-hydroxy-3-indolyl)-propionic acid) is recrystallized once from water.

When the procedure of Examples 5 and 6 is used with equivalent quantities of any of the products of Examples 2 and 4 in place of the benzyloxyindolylacetone, there are obtained:

α-Hydrazino-β-(5-hydroxy-3-indolyl)-propionic, butyric, caproic, valeric and heptanoic acids;

α-Hydrazino-α-ethyl, propyl and butyl-β-(5-hydroxy-3-indolyl)-propionic acids;

α-Hydrazino-α-methyl and ethyl-β-(5-hydroxy-3-indolyl)-butyric, caproic, valeric and heptanoic acids;

and the corresponding 5-hydroxy-1-methyl, ethyl, propyl, isopropyl, butyl and benzyl-3-indolyl compounds.

Example 7

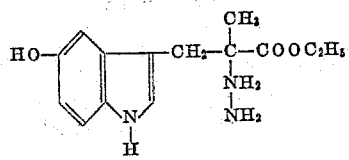

A suspension of 25 g. of α-hydrazino-α-methyl-β-(5-hydroxy-3-indolyl)propionic acid in 250 ml. of anhydrous ethanol is saturated with hydrogen chloride while being held at 10–20° C. The mixture is then refluxed 3 hours after which it is allowed to stand for 18 hours. The solvent is removed under a vacuum and the residue is redissolved in 50 ml. of ethanol under nitrogen. The ethanol is then removed. This addition of ethanol is twice repeated. The resulting hydrochloride salt of the ethyl ester is then taken up in water. The solution is filtered and the pH of the filtrate is adjusted to 8.5 with concentrated ammonium hydroxide, keeping the mixture under nitrogen at 5–10° C. The mixture is then allowed to stand for 6 hours at 5° under nitrogen after which it is filtered and the isolated product is washed 3 times with 15 ml. of water at 0° C. and then dried in a vacuum.

When methanol, isopropanol and butanol are substituted for the ethanol in the above procedure, the corresponding methyl, isopropyl and butyl esters are obtained.

Example 8

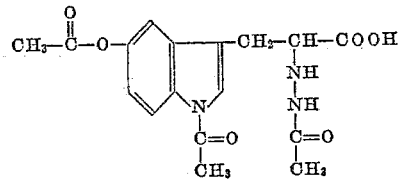

A mixture of 27.5 g. of α-hydrazino-β-(5-hydroxy-3-indolyl)propionic acid, 100 ml. of acetic anhydride and 75 ml. of pyridine is purged thoroughly with nitrogen. It is heated to 90° for 2 hours. The mixture is allowed to stand overnight at room temperature after which it is concentrated on a steam bath in vacuo to a thick syrup. The residue is stirred with ice water and made acidic with 2.5 N hydrochloric acid. The precipitated acetyl compound is isolated by filtration, washed thoroughly with ice water and dried.

When formylacetic anhydride is used in equivalent quantities in place of the acetic anhydride, the corresponding formyl compound is obtained. Similarly, when propionic or butyric anhydride are used in place of the acetic anhydride, the propionyl or butyryl compounds are obtained.

When any of the other α-hydrazino-β-(5-hydroxy-3-indolyl)-acids prepared in Example 6 are used instead of the above starting material, the corresponding acyl compounds are obtained. When the starting materials is a 1-alkyl indolyl acid, only the hydroxy and the hydrazino groups are acylated.

We claim:

1. Compounds selected from the group consisting of (1) compounds of the formula—

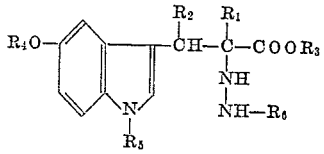

in which $R_1$, $R_2$ and $R_3$ are each selected from the group consisting of hydrogen and lower alkyl, $R_4$ and $R_6$ are each selected from the group consisting of hydrogen and lower alkanoyl and $R_5$ is selected from the group consisting of hydrogen, lower alkyl, benzyl and lower alkanoyl and (2) the non-toxic acid salts of said compounds.

2. α-Hydrazino-β-(5-hydroxy-3-indolyl) propionic acid.

3. α-Hydrazino-β-(5-hydroxy-3-indolyl)-propionic acid ethyl ester.

4. α-Hydrazino-α-methyl-β-(5-hydroxy-3-indolyl)-propionic acid.

5. α-Hydrazino-α-methyl-β-(5-hydroxy-3-indolyl)-propionic acid ethyl ester.

6. α-Hydrazino-β-(5-hydroxy-3-indolyl)-propionic acid ethyl ester hydrochloride.

7. α-Hydrazino-α-methyl-β-(5-hydroxy-3-indolyl)-propionic acid ethyl ester hydrochloride.

8. α-Acetylhydrazino-β-(5-acetoxy-1-acetyl-3-indolyl)-propionic acid.

9. α-Acetylhydrazino-α-methyl-β-(5-acetoxy-1-acetyl-3-indolyl)-propionic acid.

No references cited.